8274X
J. P. Stabler,
Breast Pump.
Patented June 19, 1834.
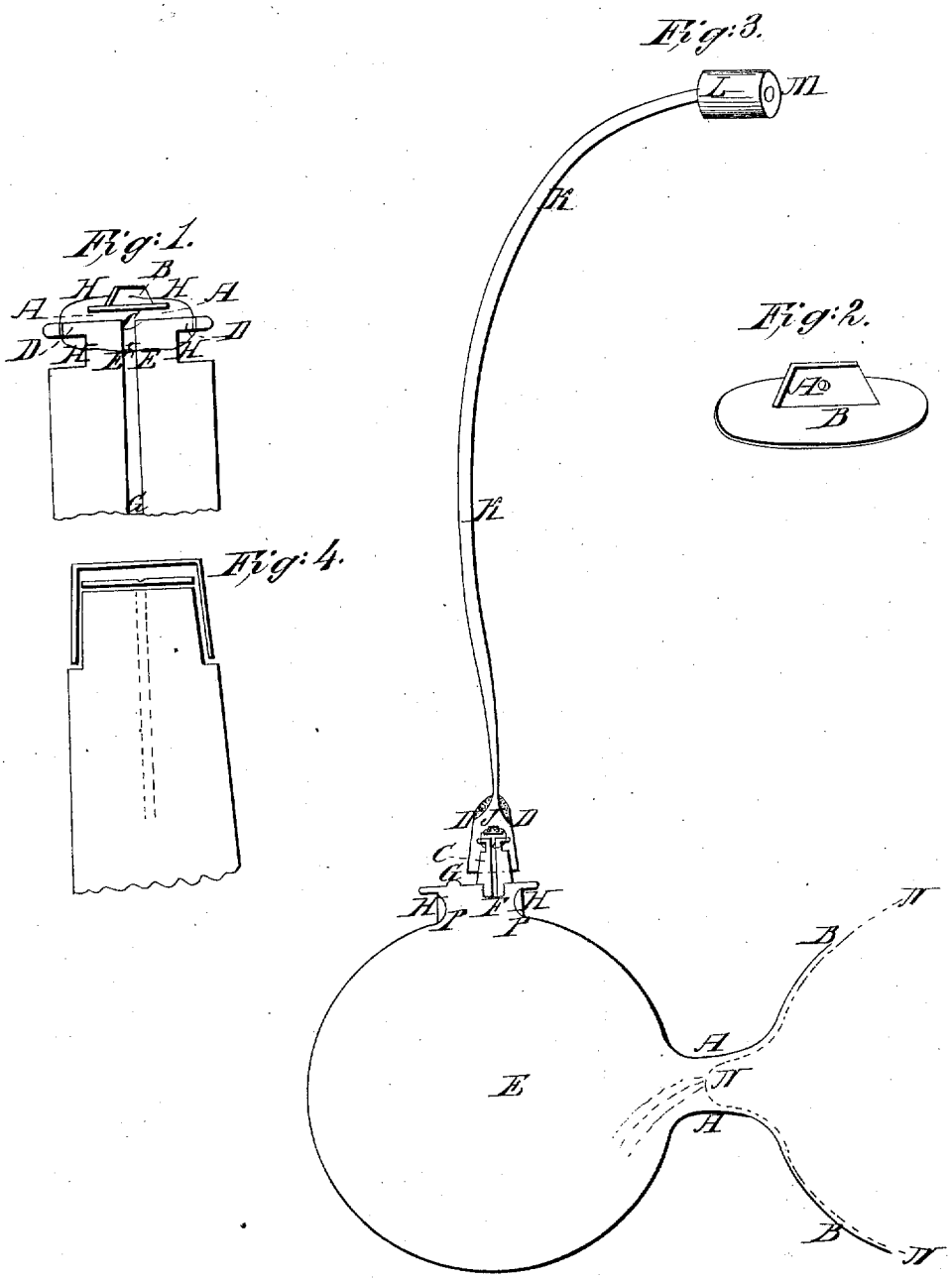
AM. PHOTO-LITHO. CO. N.Y. (OSBORNE'S PROCESS.)

June 19, 1834
8274X

James P. Stabler of Sandy Spring, Maryland,

Letters Patent

The schedule referred to in these Letters Patent and making part of the same, containing a description in the words of the said James P. Stabler himself of his improvement in the construction of a Machine for extracting milk from the breasts of women called a Pneumatic breast-pump To all to whom these presents shall come Be it known that I James P. Stabler of Sandy Spring in the County of Montgomery and State of Maryland, have invented a new and useful improvement in the construction of a Machine for extracting or drawing milk from the breasts of women, and that the following is a full and exact description of the construction and operation of the said machine as invented or improved by me, to wit — In the plate of drawings fig 3. E represents a vessel of glass or other suitable substance, having attached thereto a neck A. A, with a trumpet mouth or flanche. B. B, of a shape and size, corresponding nearly to the form and size of the nipple and to that part of the female breast including and contiguous to the areola. On the top and side of the vessel is another short neck P. P. made for the purpose of attaching to the vessel the apparatus for exausting the vessel of air, when the machine is used, which neck is left open in the construction of the vessel. H, H, represents a cap of metal or other suitable material resembling the cover for the object glass of a common telescope. the top part of this cap is perforated with a small hole at P. and with a larger hole above the letter F, this cap is fastened to the vessel with cement; F G. is a small tube of metal fastened to the cap at F with a small opening through its centre at G longitudinally of the piece - This tube is seen enlarged in fig 1st. D D, is a tube of metal
or other substance fitting over the tube F. C. air tight. To the upper
end of this tube a gum elastic pipe [or tube K, K, is attached
[near J] terminating in a mouth piece L, of bone, ivory, or other
substance having a hole through it at M, J. is a small valve
fastened by a string to the upper end of the tube F, C, (seen
enlarged in fig 2, in perspective) it is composed of a circular
plate of Metal B fig 2. to which is attached another thin piece
of Metal A at right angles, and nearly central with the piece
B, It has a small hole at A, through which a string passes
to confine it to its place. Fig 1. represents the tube F, C,
and the valve J. of figure 3. —— At G. C. fig 1st is a
small hole closed by the valve B, when it falls upon the smooth
surface A. C. A. the upper surface A. A. of the tube and
the lower surface of the valve are ground so as to fit closely,
H,H,H,H, is a string which passes through the hole B of the valve
and through two small holes D, D, of the tube and tied round
the neck H,H, at E. E. of the tube The elasticity of this string
suffers the valve to open and close when in use Method of using The mouthpiece A. A. B. B. fig 3, being placed directly
over the nipple N. (a portion of the breast being represented
by the dotted lines N. N. N. and pressed gently towards
the breast, the operator applies her mouth to the part L,
(covering the hole M) at the same time covering the small
hole G. of the cap H,H, with the thumb or finger of the hand,
with which she holds the instrument to the breast, upon sucking
or drawing at the mouth piece L a portion of air contained
within the vessel E. ascends through the orifice F of the tube
F. C. opens the valve J. and passing through the pipe K, K,
reaches the mouth of the operator, As soon as the operator
ceases to draw the the valve J. shuts down and prevents the
admission of the external air within the vessel, This 8274X 67.

operation is repeated until a sufficient vacuum is formed within the vessel, to cause the milk to flow, the valve closing at each time, preserving the vacuum then formed, The perforation of the cap at G, is intended to admit the external air to the vessel when the drawing power of the instrument is too great for the patient to bear, and to remove it without pain from the breast This is effected by raising the thumb, or finger, which cover the small orifice G.

The improvement claimed under this specification, are the application of a valve to the Pneumatic breast pump, in which the vacuum is formed by the mout of the operator.

The form and position of the valve, may be changed at pleasure, and also the material of which it is composed, only one mode of its application has been described, and only one form used in the operating machine deposited herewith in the Patent Office, The valve of whatever shape or form when applied, to a Machine for drawing the female breast where the mouth of the operator is used for forcing the vacuum, is therefore claimed, by which the instrument having been exausted to the desired extent, may be kept upon the breast without the constant exertion of the mouth, of the operator, 2ndly, The perforation of the cap or vessel by which means the external air may be admitted to diminish the drawing power of the instrument, when painful to the Patient, and by which the operation may be immediately suspended without inconvenience, ..

Witnesses
Robt Clarke
William Wallace

Lewis P. Hebler [illegible]

1068 - 91

Exd
[illegible]